(12) United States Patent
Kushwah et al.

(10) Patent No.: US 9,934,104 B2
(45) Date of Patent: *Apr. 3, 2018

(54) METADATA GENERATION FOR INCREMENTAL BACKUP

(71) Applicant: EMC IP Holding Company LLC, Hopkinton, MA (US)

(72) Inventors: Ajay Pratap Singh Kushwah, San Ramon, CA (US); Ramesh A. Babu, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,593

(22) Filed: Feb. 13, 2015

(65) Prior Publication Data

US 2015/0286535 A1 Oct. 8, 2015

Related U.S. Application Data

(63) Continuation of application No. 13/250,303, filed on Sep. 30, 2011, now Pat. No. 8,990,162.

(51) Int. Cl.
*G06F 11/00* (2006.01)
*G06F 11/14* (2006.01)

(52) U.S. Cl.
CPC ...... *G06F 11/1451* (2013.01); *G06F 11/1435* (2013.01); *G06F 11/1469* (2013.01); *G06F 2201/80* (2013.01); *G06F 2201/84* (2013.01)

(58) Field of Classification Search
CPC .................. G06F 11/1451; G06F 17/30088
USPC ......................................................... 707/646
See application file for complete search history.

(56) References Cited

U.S. PATENT DOCUMENTS 8,046,333 B1 * 10/2011 Wang ................ G06F 17/30091
707/646
8,533,818 B1 * 9/2013 Ketterhagen ......... G06F 21/567
726/22

* cited by examiner

*Primary Examiner* — Alexey Shmatov
(74) *Attorney, Agent, or Firm* — Van Pelt, Yi & James LLP

(57) ABSTRACT

Metadata generate for incremental backup is disclosed. A subset of blocks used to store file system metadata are identified in a set of blocks changed since a last backup. File system metadata stored in the subset of blocks is used to obtain file system metadata associated with file system objects that have been created and/or modified since the last backup. The file system metadata associated with file system objects that have been created and/or modified since the last backup is used to generate file system metadata files for the incremental backup.

20 Claims, 6 Drawing Sheets

METADATA GENERATION FOR INCREMENTAL BACKUP

CROSS REFERENCE TO OTHER APPLICATIONS

This application is a continuation of co-pending U.S. patent application Ser. No. 13/250,303, entitled METADATA GENERATION FOR INCREMENTAL BACKUP filed Sep. 30, 2011, which is incorporated herein by reference for all purposes.

BACKGROUND OF THE INVENTION

In a block based backup, point in time snapshot of a disk or volume is backed up as an opaque stream, providing for efficient copying of data to backup media. To support selective recovery of specific files and/or directories, some block based backup solutions parse and store file system metadata. When a file or directory is requested to be restored, the file system tree is reconstructed to determine which blocks of data are required to be read from backup media and copied to the restore target system.

In an incremental backup, only blocks that have been changed since a last full or incremental backup typically are copied to backup media. For example, disk blocks that have been written to in connection with creating or modifying a file are marked as changed, and when the next incremental backup is done any block marked as having been written to is copied to backup media. In current prior art approaches to performing an incremental backup in a block based backup solution, file system metadata for the entire file system is parsed and stored to backup media, to enable file-by-file recovery.

BRIEF DESCRIPTION OF THE DRAWINGS

Various embodiments of the invention are disclosed in the following detailed description and the accompanying drawings.

DETAILED DESCRIPTION

Figure 1:
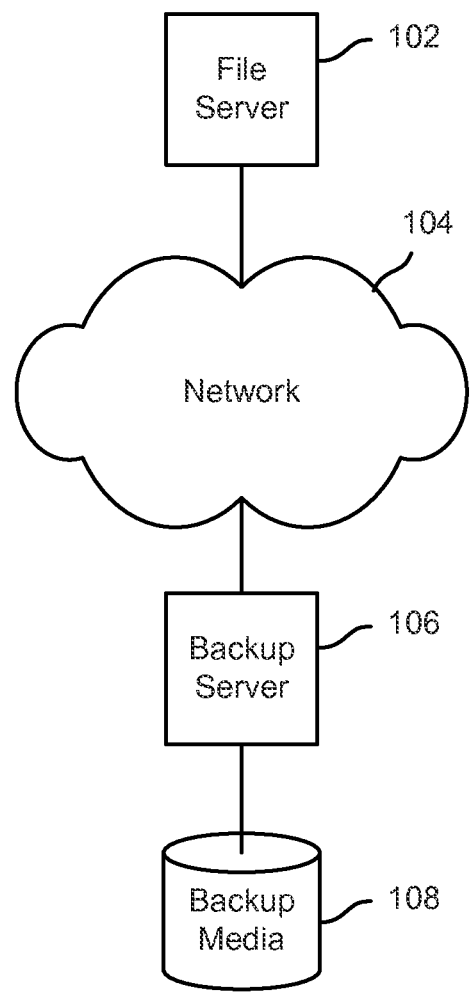
FIG. 1 is a block diagram illustrating an embodiment of a block based backup system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Metadata generation for incremental backup in a block based backup system is disclosed. In various embodiments, when a full backup is conducted blocks used to store file system metadata (e.g., inode table in Unix operating systems, Master File Table in Microsoft Windows, etc.) are noted. A timestamp is associated with file system metadata as generated and stored in the full backup. On incremental backup, the blocks that have been changed are filtered to identify which blocks are associated with file system metadata (e.g., MFT zone of blocks). The file system metadata stored in those blocks is parsed and analyzed to determine which have been modified since the last backup, i.e., which are associated with file system objects that have been created and/or modified since the last backup. The modified file system metadata is processed and sent to the backup server, where it is used to update a copy of the file system metadata as stored in connection with the full backup to provide a complete snapshot of the state of the file system at the time of the incremental backup.

FIG. 1 is a block diagram illustrating an embodiment of a block based backup system. In the example shown, a file server 102, e.g., a network attached storage (NAS) such as EMC Centerra and/or another backup client or host, is connected via a network 104 to a backup server 106. A backup client running on file server 102 is configured to cooperate with backup server 106 to cause data stored on file server 102 to be backed up to backup media 108, e.g., a tape or other transferable media; hard disk, solid state, or other installed storage devices; cloud-based storage; etc. In a block based backup solution, as noted above, blocks of data are backed up as an opaque stream of data, copied in this example across network 104 or another network or communication media. To support selective recovery of specific file system objects, such as files or directories, as opposed to disaster recovery of the entire file server 102 (or disks/volumes thereof), file system metadata is stored on backup media 108. Examples of file system metadata include, without limitation, data indicating how file system objects are related to one another in a file system hierarchy of the file system (e.g., directories, subdirectories, files).

Figure 2A:
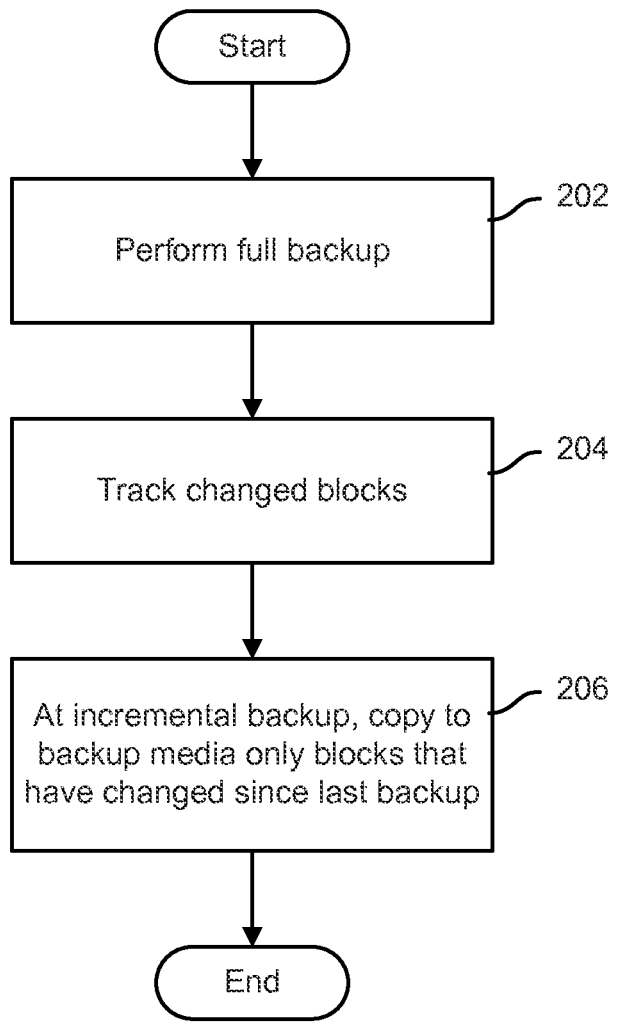
FIG. 2A is a flow diagram illustrating an embodiment of a process to backup data.

FIG. 2A is a flow diagram illustrating an embodiment of a process to backup data. In the example shown, a full backup is performed (202). A bitmap or other data structure is used to track which blocks have been written to since the full backup (204). In some embodiments, a copy-on-write driver or other file system write intercept driver intercepts application or other calls to the file system to create and/or write data to file system objects. Each block that is observed to have been written to is marked as changed ("dirty") in the bitmap or other data structure. At incremental backup, only data comprising blocks that have been marked as having been changed since the last full (or incremental) backup are copied to backup media (206). While the incremental approach to block based backups avoids transmitting across a network such as network 104 blocks that have not changed since the last backup, in a typical approach file system metadata for the entire file system is parsed, transmitted, and stored, to enable any requested file system object and its associated full path name to be reconstructed if required to support selective recovery, for example of a specified file. In recent times file servers and other storage systems have been used to store file systems that include a very large number of files, and in such circumstances the CPU cycles and associated time required to generate and backup file system metadata for the entire file system, even in an incremental backup in which relatively few files have changed since the last backup, may be the same as for a full backup and in some conditions can consume orders of magnitude more time and CPU cycles than the copying of data blocks that have been changed since the last backup (see examples below).

Figure 2B:
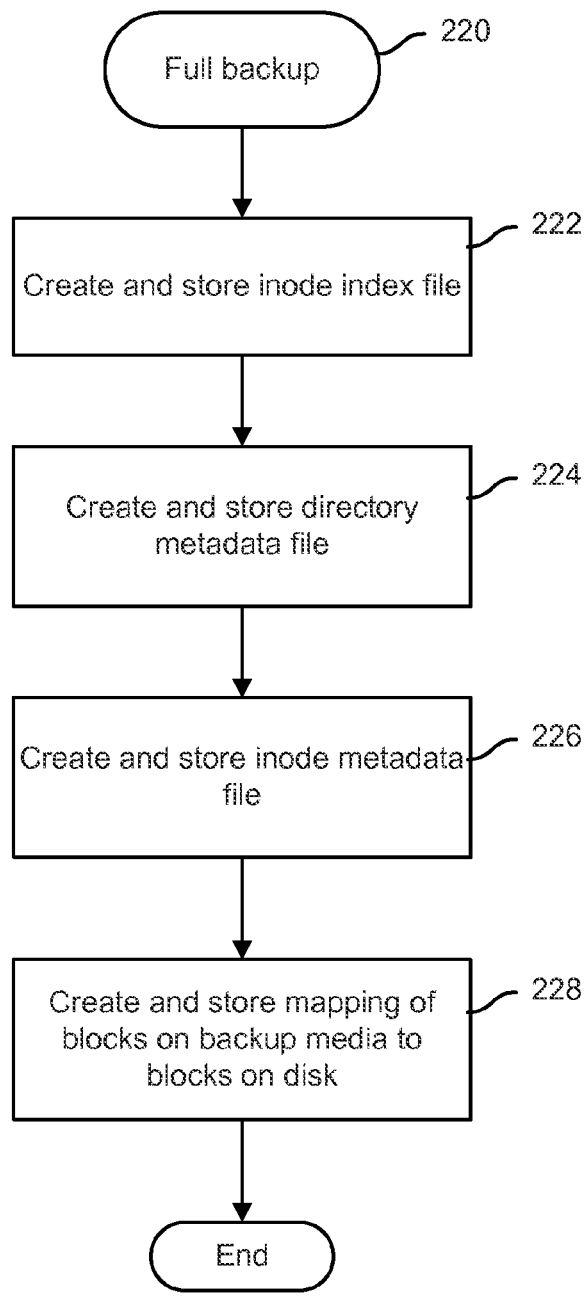
FIG. 2B is a flow diagram illustrating an embodiment of a process to perform a full block based backup.

FIG. 2B is a flow diagram illustrating an embodiment of a process to perform a full block based backup. In the example shown, three file system metadata related backup files are created and stored to backup media: an inode (or equivalent) index file (222), a directory metadata file (224), and an inode metadata file (226). In some embodiments, the directory metadata file and the inode metadata file store file system metadata for directory and file objects, respectively. The inode index file includes for each inode number data indicating where corresponding file system metadata is stored in either the directory metadata file or inode metadata file, as applicable (i.e., depending on whether the object is a directory or a file). File system object data blocks are stored on backup media, and a mapping of blocks as stored on backup media (e.g., tape or other removable media) to blocks as stored on disk is created and stored (228), e.g., in a separate mapping file. In some embodiments, the file system metadata files described above are used at recovery time to reconstruct file system information as required to restore a file system object, such as a specified file or directory.

Techniques to store only incremental file system metadata in connection with an incremental block-based backup are disclosed. To enable only changed file system metadata to be backed up at incremental backup time, for example only file system metadata for file system objects that have been created or modified since a last full or incremental backup, the full backup process is modified to store additional information to be used to facilitate backing up only changed file system metadata at incremental backup time. In the example shown, file system metadata is augmented as backed up to include parent inode information, and a timestamp is stored to enable "last modified" timestamps to be used at incremental backup time to identify file system metadata that has changed since the last full or incremental backup.

Figure 3:
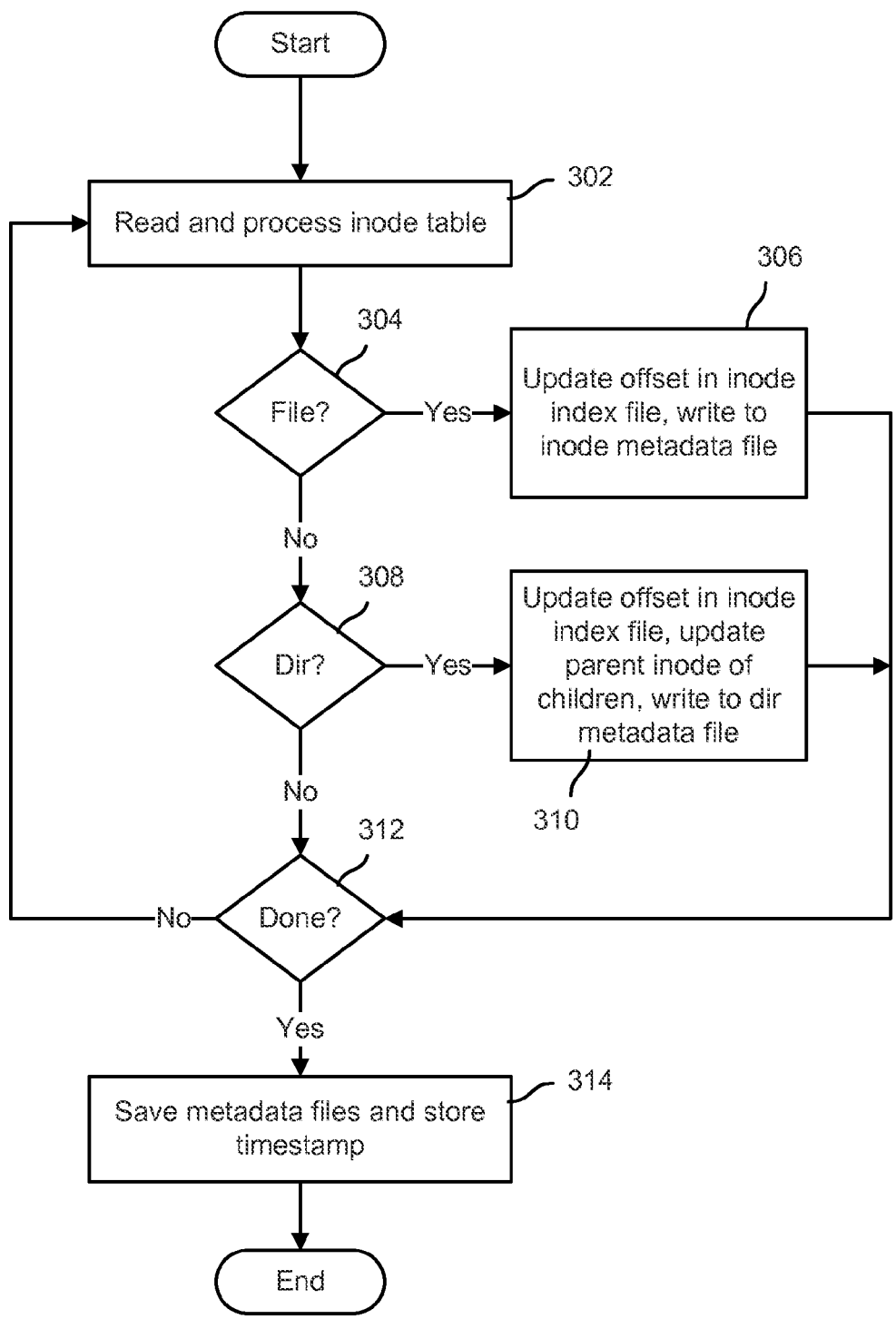
FIG. 3 is a flow diagram illustrating an embodiment of a process to store file system metadata in connection with a full block based backup.

FIG. 3 is a flow diagram illustrating an embodiment of a process to store file system metadata in connection with a full block based backup. In some embodiments, a file system metadata thread implements the process of FIG. 3, while a separate file system object data thread transfers blocks comprising file data. In the example shown, inode (or other file system metadata) table entries are read and processed (302). If a node is a file (304), its file system metadata is written to an inode metadata file and the location within the inode metadata file is written to an inode index file (306). If the node is a directory (308), metadata records for children (e.g., subdirectories, files) of the directory are updated to identify the node as their parent, the directory node metadata is written to a directory metadata file, and the location of the directory's metadata within the directory metadata file is written to the inode index file (310). The process iterates through nodes in the inode table until done (312). The inode index, inode metadata, and directory metadata files are saved and file system metadata timestamp is stored (314).

Figure 4:
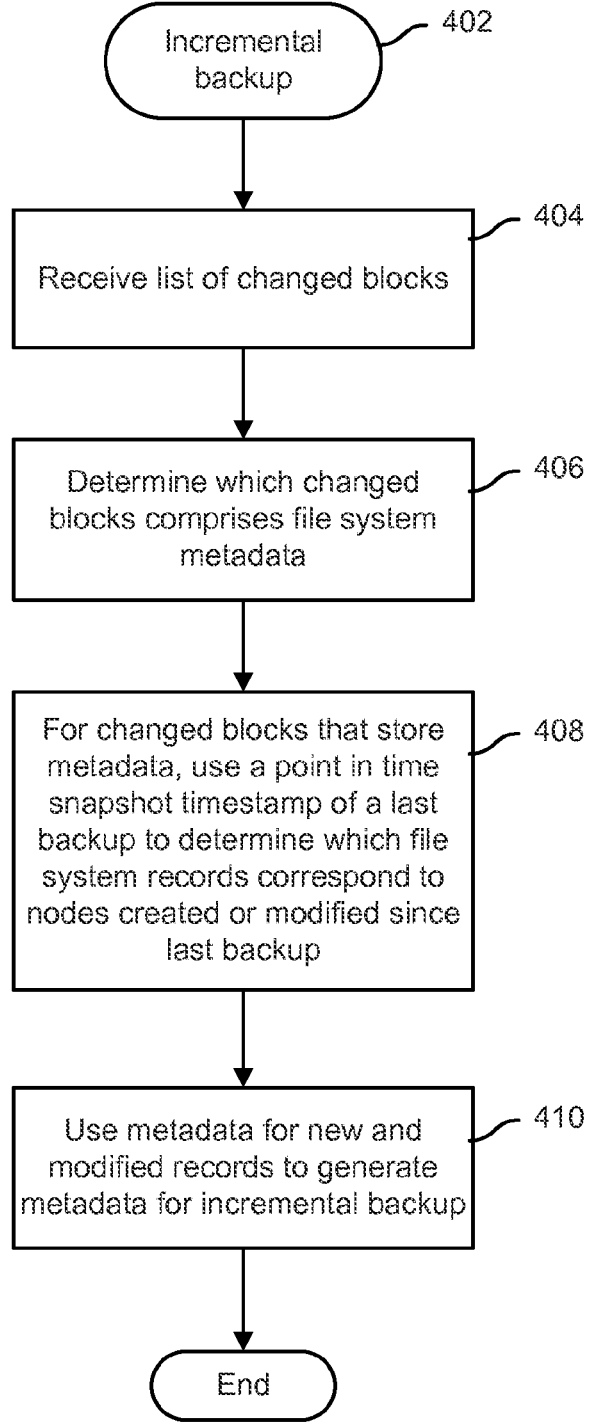
FIG. 4 is a flow diagram illustrating an embodiment of a process to perform an incremental block based backup.

FIG. 4 is a flow diagram illustrating an embodiment of a process to perform an incremental block based backup. In the example shown, when an incremental backup is performed (402) a list of changed blocks is received (404), for example by reading a bit map as described above. It is determined which of the changed blocks are associated with file system metadata (406). For example, in an NTFS file system, a fixed range of blocks are designated to store the Master File Table (MFT), sometimes referred to as the MFT Zone. As a result, blocks within the file system metadata zone can be identified. A block of standard block based backup size (e.g., 64K) may include file system metadata for multiple file system objects; therefore, it is not necessarily the case that all file system metadata stored in a changed block in the MFT zone (or equivalent) will have changed since the last backup. Therefore, for each changed block that stores file system metadata, it is determined which sets of file system metadata have changed since the last backup, for example by virtue of being associated with file system objects that have been created and/or modified since the last full or incremental backup (408). In some embodiments, a file system metadata objects create or "last modified" timestamp of each record in the file system metadata changed block is compared with a file system metadata or other timestamp associated with the last full or incremental backup, such as a timestamp stored as in 314 of FIG. 3, to determine whether the record is one that has changed since the last backup. File system metadata that is determined to have been changed since the last backup is used to generate metadata files for the incremental backup (410), as described more fully below.

Figure 5:
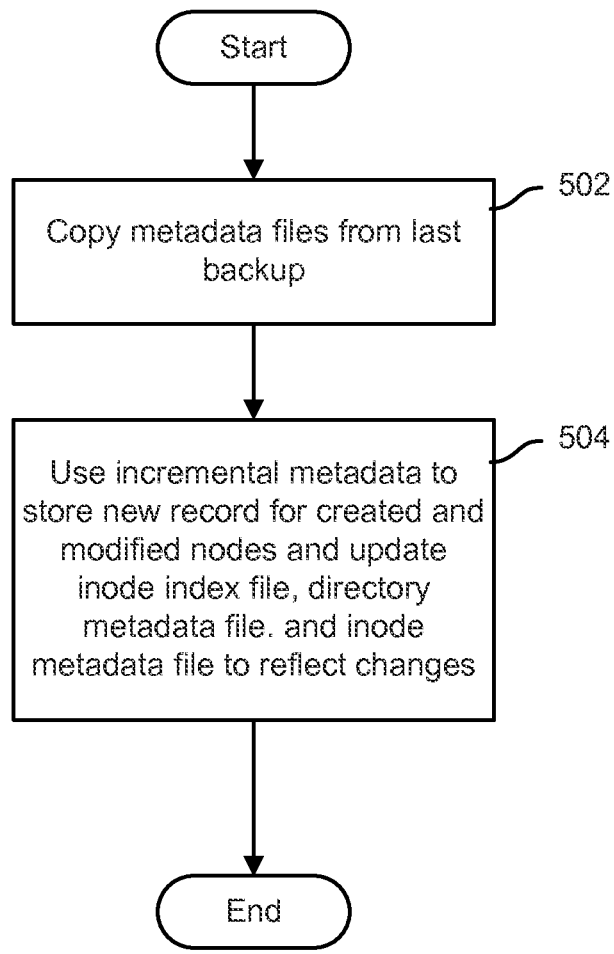
FIG. 5 is a flow diagram illustrating an embodiment of a process to store file system metadata in connection with an incremental backup.

FIG. 5 is a flow diagram illustrating an embodiment of a process to store file system metadata in connection with an incremental backup. In the example shown, file system metadata files created and stored to backup media during the last full or incremental backup are copied (502). Examples include the inode index, directory metdata, and inode metadata files described above. Incrementally changed file system metadata, generated for example as described above in connection with FIG. 4, is used to update the file system metadata file copies to create for the incremental backup file system metadata files comprising file system metadata for the entire file system as of the time of the incremental backup (504). In some embodiments, a new or modified file system metadata record is appended to the previously copied directory metadata or inode metadata file, and the previously copied inode index file is updated to point to the new or modified record. In some embodiments, parent inode data included in file system metadata at full backup is used to update file system metadata for parent nodes affected by changes to file system metadata of their children nodes. For example, if a child node's file system metadata indicates the child object has been deleted or modified, the file system typically does not update the metadata of the parent node. Therefore, to be able to present a full and logically consistent view, previously stored parent inode information is used to update the file system metadata of a parent inode if a child file system object is determined to have been deleted or modified.

Using techniques disclosed herein true incremental backup is achieved, because at incremental backup only file system metadata that has changed since the last full backup is parsed and backed up.

The following comparative examples illustrate certain advantages of the approach disclosed herein as observed in some embodiments. Data was backed up from a host running the Windows™ 2008 x64 operating system. The host had one quad core processor (4 CPUs) running at 2.33 GHz, 64 bit, with 4 GB RAM and a 254 GB source volume with 10 million (MM) files at full backup, and the indicated number of files added for subsequent incremental backup. Prior to implementing techniques disclosed herein, the full backup took approximately 1 hour 42 minutes to backup data blocks and 41 minutes 23 seconds to generate file system metadata for the full backup. Subsequently, incremental backups were performed after adding 5K, 10K, 50K, 100K, 1M, 2M, 3M, and 5M files to the volume. In the incremental backups, the time to generate metadata varied from 22 to 40 minutes, depending on the number of files added (for example, 28 min 33 seconds when 5,000 files were added; 23 min 46 seconds when 100K files were added; 25 min 27 seconds when 1M files were added; and 40 min when 5M files were added).

By comparison, using techniques described herein to generate file system metadata files for incremental backup resulted in file system metadata generation times under the above conditions being reduced to 9 seconds for the case in which only 5,000 files were added to the volume, increasing to 1 minute 16 seconds when 100K files were added, 11 min 34 seconds when 1M files were added, and 20 minutes when 5M files where added. The above examples show drastically decreased time to generate file system metadata for incremental backup when 100K or fewer files had been added to the 10M file volume, and metadata generation time cut about in half even under conditions in which a great many new files had been added (e.g., 1M, 5M, or more).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating file system metadata for incremental backup, comprising:
   reading a bitmap to determine a change block list comprising one or more blocks, wherein the change block list indicates blocks that have changed since a previous backup, wherein the one or more blocks were marked as having been changed since the previous backup;
   determining which of the one or more blocks on the change block list stores file system metadata, wherein the one or more blocks on the change block list include at least one block storing file data and at least one block storing file system metadata;
   determining that a first block of the one or more determined blocks on the change block list is configured to store file system metadata associated with a first file system object and file system metadata associated with a second file system object;
   determining that the file system metadata associated with the first file system object stored in the first block has been modified since the previous backup and the file system metadata associated with the second file system object stored in the first block has not been modified at least in part by comparing a first file system object timestamp of the file system metadata associated with the first file system object and a second file system object timestamp associated with the second file system object with a timestamp associated with the previous backup; and
   generating file system metadata for the incremental backup by using the modified file system metadata associated with the first file system object.

2. The method of claim 1, wherein generating file system metadata for the incremental backup by using the modified file system metadata associated with the first file system object includes copying file system metadata associated with the previous backup.

3. The method of claim 2, further comprising using the modified file system metadata associated with the first file system object to replace or update the file system metadata associated with the first file system object that was stored as part of the previous backup.

4. The method of claim 2, wherein the file system metadata associated with the previous backup include one or more of an inode index file, a directory metadata file, and an inode metadata file.

5. The method of claim 1, wherein file system metadata that is generated as part of a full backup or an incremental backup is stored with a timestamp.

6. The method of claim 5, wherein the timestamp associated with the previous backup was generated as part of the previous backup.

7. The method of claim 1, further comprising including in file system metadata that is generated as part of a full backup parent node identification data that identifies a parent node of a file system node that comprises a subdirectory, file, or other node that has a parent node in the file system hierarchy.

8. The method of claim 7, further comprising using the parent node identification data stored at the full backup to update a parent node file system metadata in connection with an incremental backup in which file system metadata associated with a child node of the parent node has been changed.

9. A system to generate file system metadata for incremental backup, comprising:
   a memory configured to store a bitmap usable to track which of a plurality of data blocks have been modified since a last backup; and
   a processor coupled to the memory and configured to:
      reading the bitmap to determine a change block list comprising one or more blocks, wherein the change block list indicates blocks that have changed since a previous backup, wherein the one or more blocks were marked as having been changed since the previous backup;
      determine which of the one or more blocks on the change block list stores file system metadata, wherein the one or more blocks on the change block list include at least one block storing file data and at least one block storing file system metadata;
      determining that a first block of the one or more determined blocks on the change block list is configured to store file system metadata associated with a first file system object and file system metadata associated with a second file system object;

determine that the file system metadata associated with the first file system object stored in the first block has been modified since the previous backup and the file system metadata associated with the second file system object stored in the first block has not been modified at least in part by comparing a first file system object timestamp of the file system metadata associated with the first file system object and a second file system object timestamp associated with the second file system object with a timestamp associated with the previous backup; and generate file system metadata for the incremental backup by using the modified file system metadata associated with the first file system object.

10. The system of claim 9, wherein the processor is configured to generate file system metadata for the incremental backup by using the modified file system metadata associated with the first file system object at least in part by copying file system metadata associated with the previous backup.

11. The system of claim 10, wherein the processor is further configured to use the modified file system metadata associated with the first file system object to replace or update the file system metadata associated with the first file system object that was stored as part of the previous backup.

12. The system of claim 10, wherein the file system metadata associated with the previous backup include one or more of an inode index file, a directory metadata file, and an inode metadata file.

13. The system of claim 9, wherein file system metadata that is generated as part of a full backup or an incremental backup is stored with a timestamp.

14. The system of claim 13, wherein the timestamp associated with the previous backup was generated as part of the previous backup.

15. The system of claim 9, wherein the processor is further configured to include in file system metadata that is generated as part of a full backup parent node identification data that identifies a parent node of a file system node that comprises a subdirectory, file, or other node that has a parent node in the file system hierarchy.

16. The system of claim 15, wherein the processor is further configured to use the parent node identification data stored at the full backup to update a parent node file system metadata in connection with an incremental backup in which file system metadata associated with a child node of the parent node has been changed.

17. A computer program product to generate file system metadata for incremental backup, the computer program product being embodied in a non-transitory tangible computer readable storage medium and comprising computer instructions for:

reading a bitmap to determine a change block list comprising one or more blocks, wherein the change block list indicates blocks that have changed since a previous backup, wherein the one or more blocks were marked as having been changed since the previous backup;

determining which of the one or more blocks on the change block list stores file system metadata, wherein the one or more blocks on the change block list include at least one block storing file data and at least one block storing file system metadata;

determining that a first block of the one or more determined blocks on the change block list is configured to store file system metadata associated with a first file system object and file system metadata associated with a second file system object;

determining that the file system metadata associated with the first file system object stored in the first block has been modified since the previous backup and the file system metadata associated with the second file system object stored in the first block has not been modified at least in part by comparing a first file system object timestamp of the file system metadata associated with the first file system object and a second file system object timestamp associated with the second file system object with a timestamp associated with the previous backup; and generating file system metadata for the incremental backup by using the modified file system metadata associated with the first file system object.

18. The computer program product of claim 17, generating file system metadata for the incremental backup by using the modified file system metadata associated with the first file system object includes copying file system metadata associated with the previous backup.

19. The computer program product of claim 18, further comprising computer instructions for using the modified file system metadata associated with the first file system object to replace or update the file system metadata associated with the first file system object that was stored as part of the previous backup.

20. The computer program product of claim 19, wherein the timestamp associated with the previous backup was generated as part of the previous backup.

* * * * *